United States Patent
Rudolph et al.

[15] 3,680,289
[45] *Aug. 1, 1972

[54] PROCESS OF SEPARATING TETRAFLUOROETHYLENE FROM GAS MIXTURES CONTAINING THE SAME

[72] Inventors: Werner Rudolph; Joachim Massonne, both of Hannover, Germany

[73] Assignee: Kali-Chemie Aktiengesellschaft, Hannover, Germany

[ * ] Notice: The portion of the term of this patent subsequent to June 1, 1989, has been disclaimed.

[22] Filed: Feb. 26, 1971

[21] Appl. No.: 119,305

Related U.S. Application Data

[63] Continuation-in-part of Ser. No. 886,608, Dec. 2, 1969, Pat. No. 3,581,466.

[30] Foreign Application Priority Data

May 29, 1970   Germany.............P 20 26 188.5

[52] U.S. Cl..........................................55/48, 55/71
[51] Int. Cl. ............................................B01d 53/14
[58] Field of Search ......55/56, 71, 84, 48; 260/653.3

[56] References Cited

UNITED STATES PATENTS 3,581,466   6/1971   Rudolph et al. ...................55/71
3,236,030   2/1966   Von Tress......................55/71 X

FOREIGN PATENTS OR APPLICATIONS 1,247,298   1/1970   Germany...................260/653.3
1,468,451   1/1970   Germany...................260/653.3

*Primary Examiner*—Reuben Friedman
*Assistant Examiner*—R. W. Burks
*Attorney*—Michael S. Striker

[57] ABSTRACT

Process for separating tetrafluoroethylene from gas mixtures containing in addition to tetrafluoroethylene, perfluorohydrocarbons and/or hydrogen containing fluorohydrocarbons with one to four carbon atoms, excepting from gas mixtures obtained in the pyrolysis of difluoromonochloromethane which comprises passing the gas mixtures at a temperature of from +60° to −30° C. in countercurrent contact with methylisobutylketone in a separatory zone, collecting the tetrafluoroethylene at the top of said zone and the methylisobutylketone containing said perfluorohydrocarbons and/or hydrogen containing fluorohydrocarbons at the bottom of said zone.

6 Claims, 1 Drawing Figure

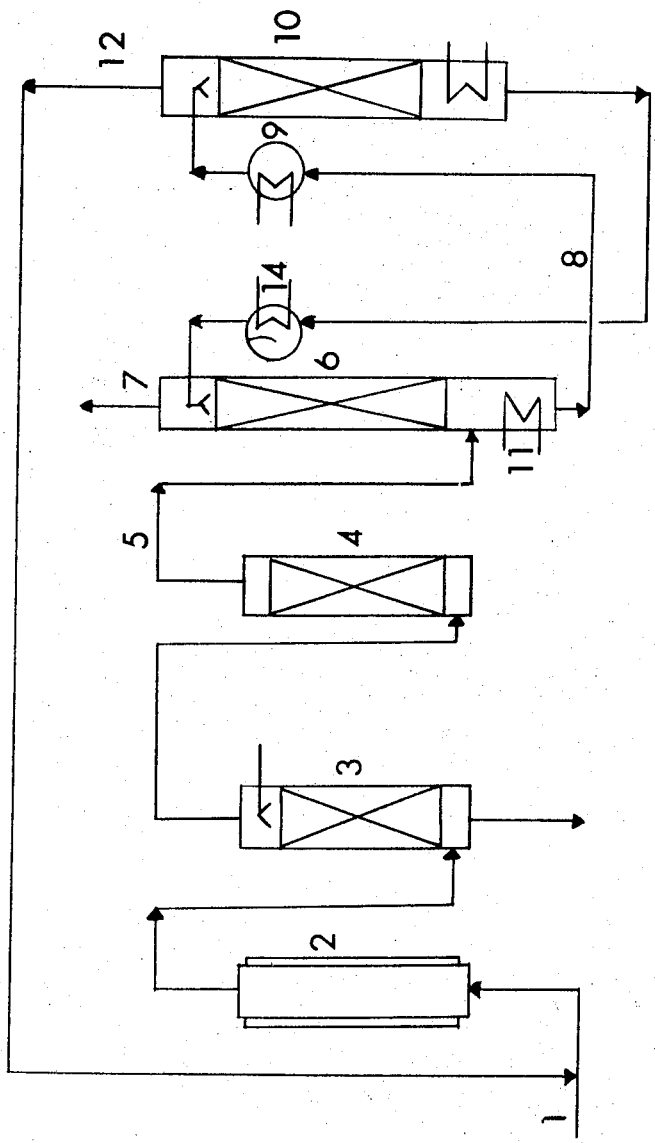

PROCESS OF SEPARATING TETRAFLUOROETHYLENE FROM GAS MIXTURES CONTAINING THE SAME

CROSS REFERENCE TO RELATED APPLICATION

This application is a continuation-in-part of application, Ser. No. 886,608, filed Dec. 2, 1969, now U.S. Pat. No. 3,581,466.

This invention relates to an improved process for separating tetrafluoroethylene from gas mixtures containing the same. More particularly this invention relates to a process for separating tetrafluoroethylene from gas mixtures containing the same obtained in the pyrolysis of difluoromonochloromethane.

Tetrafluoroethylene is utilized in large quantities as the starting material for the manufacture of polytetrafluoroethylene.

The preparation of tetrafluoroethylene for the most part is through the pyrolysis of difluoromonochloromethane which is carried out at temperatures over about 500° C. In this reaction in which hydrogen chloride is split off, there are recovered, in addition to tetrafluoroethylene, a considerable number of other fluorinated hydrocarbons as by products. The pyrolysis mixtures contain in addition to the tetrafluoroethylene a small amount of high boiling compounds and members of the group of perfluorohydrocarbons such as octafluorocyclobutane, perfluoroisobutylene, octafluoropropane, trifluoromonochloromethane, hexafluoropropene, hexafluoroethane, pentafluorochloroethane and tetrafluoromethane and hydrogen containing fluorohydrocarbons such as for example, difluorochloromethane, trifluoromethane, difluoromethane, pentafluoroethane, chlorotetrafluoroethane and chlorohexafluoropropane. The actual amount of each of these compounds present in the mixture to a large extent depends on the conditions used in the pyrolysis. In addition, the pyrolysis reaction mixture contains a large proportion by volume of unconverted difluoromonochloromethane. In general, in the manufacture of tetrafluoroethylene by pyrolysis, only about 20 to 35 percent of the difluoromonochloromethane is converted, otherwise the yield of tetrafluoroethylene is decreased and the portion of higher boiling fluorinated hydrocarbons present in the pyrolysis gas is increased.

In order to make the manufacture of tetrafluoroethylene economically satisfactory, it is therefore necessary to be able to separate the tetrafluoroethylene in as simple a manner as possible and in as pure a state as possible from the reaction mixture. It is also necessary that the process allow for recycling the unconverted difluoromonochloromethane to the pyrolysis reaction. The heretofore known processes have not proved suitable for these purposes. The separation of tetrafluoroethylene from the pyrolysis mixtures is carried out in general through a pressure distillation in a fractionating column whereby a top distillate is recovered which in addition to tetrafluoroethylene contains all of the compounds present in the mixture having a boiling point which is lower than that of tetrafluoroethylene, such as, for instance, trifluoromethane, trifluoromonochloromethane, hexafluoroethane and difluorochloroethylene. In a second process step, the top distillate has to be separated into tetrafluoroethylene and the lower boiling compounds. According to the process of German Pat. No. 1,247,298, for example, the head distillate is separated in a separating vessel by contacting the distillate with a polar organic solvent, as for instance, dimethylformamide, ethanol, propanol, benzene, toluene, methylethylketone, methanol or acetone at a temperature of between 0° and −20° C., whereby the lower boiling compounds are dissolved in the organic solvent and the tetrafluoroethylene is recovered at the head of the separator. According to the process of German Pat. No. 1,161,887, the reaction mixture is subjected to a pressure distillation and a top distillate recovered from which, in a second step, through extractive distillation with a halogenated hydrocarbon, the tetrafluoroethylene can be separated.

One major disadvantage of these processes for recovering pure tetrafluoroethylene is, that for the isolation of the tetrafluoroethylene, two different process steps are required. In this connection, the rectification of the tetrafluoroethylene containing gas mixture under pressure, requires a large outlay for apparatus and the observance of very strict precautionary measures in order to avoid spontaneous polymerization and explosions. The carrying out of the known processes is therefore generally difficult to undertake.

Still another major disadvantage of the known process is that not one of the proposed solvents was effective to dissolve the perfluorohydrocarbons present in the pyrolysis mixtures.

In accordance with the invention, there is now provided an improved process for separating tetrafluoroethylene from gas mixtures containing the same, which have been produced in the pyrolysis of difluoromonochloromethane, which comprises contacting such a pyrolysis gas mixture, following the separation therefrom of hydrogen chloride, at a temperature of between about +60° and −30° C., in a separating vessel with methylisobutylketone passed in counterflow relationship thereto, recovering the tetrafluoroethylene at the top and the methylisobutylketone containing the remaining components of the pyrolysis at the bottom of the separator. It has been established in accordance with the invention, that methylisobutylketone is a much better solvent for the other fluorinated hydrocarbons produced in the pyrolysis than it is for tetrafluoroethylene. It is not necessary for recovering pure tetrafluoroethylene to first carry out a separation of the reaction gas mixture into different fractions by pressure distillation. The absorbed compounds present in the methylisobutylketone can be separated therefrom by warming the solution. The thereby recovered gas mixture consisting of difluoromonochloromethane and the by products of pyrolysis boiling at up to room temperature can be advantageously recycled into the pyrolysis. It has already been proposed that a part of the by products boiling above tetrafluoroethylene, which are recovered as a sump product in the recovery of tetrafluoroethylene by pressure distillation be subjected again to pyrolysis. The products recovered from the methylisobutylketone are better suited for recycle into the pyrolysis in that they only contain the lower boiling by products, which can be more advantageously utilized, the high boiling difficulty pyrolyzable impurities not being separated out in the warming of the methylisobutylketone solution. The gas mixture recovered following the warming of the methylisobutylketone can be separated by any of the known methods and single fluorinated hydrocarbon compounds isolated if these are present in the gas mixture in sufficiently large amounts that this is desirable.

There has most surprisingly been found, in accordance with the invention, that the solvent need be used only in very small amounts compared to the amounts of gas mixture. The volume ratio of methylisobutylketone to pyrolysis gas mixture lies in the range of 1:10 to 1:50 and preferably amounts to 1:20 to 1:40.

Although, on the basis of the large differences in the solubility of the tetrafluorethylene and the other fluorinated hydrocarbons, good separation results can be obtained over the total temperature range of +60° to −30° C., the results can be improved by working at temperatures between 0° and −20° C. and using high flow velocities. Most preferably, the separation is carried out at the lower temperatures, i.e., 0° and −20° C., as at this temperature range, the volume of methylisobutylketone to gas mixture is most favorable; at higher temperatures, larger quantities of solvent being necessary. Thus by suitable selection of the temperatures, lower expenditures are required in the separation.

It has further been found that instead of methylisobutylketone alone, a mixture of methylisobutylketone and an aliphatic halogenated hydrocarbon, F and/or Cl substituted hydrocarbons which are liquids at the conditions involved and whose boiling points are not under about 80° C., can be used. A particularly suitable solvent for use in admixture with methylisobutylketone is perchloroethylene. The mixing ratio of the two components can vary within wide limits. There can be used, for instance, a methylisobutylketone and perchloroethylene mixture having a volume ratio of 5:1 to 1:1. The addition of an aliphatic halogenated hydrocarbon is associated with further advantages. The resultant mixture is an excellent solvent for the pyrolysis gas components so that tetrafluoroethylene is also thereby obtained having a purity of 99 percent. This mixture is also a better solvent for the high boiling components, the solvent can therefore be maintained in the circulation longer without the necessity of stopping to remove these high boiling components. Above all, the flash point of methylisobutylketone is changed by the addition of a halogenated hydrocarbon so that an easier handling of the mixture on a technical scale is made possible.

The pyrolysis mixtures which may be processed in accordance with the invention include all mixtures recovered in the preparation of tetrafluoroethylene by thermal decomposition of perfluoroalkanes having more than three carbon atoms, from fluoroform or bromodifluoromethane. Other gas mixtures which can be treated are crude tetrafluoroethylene, mixtures obtained in the pyrolysis of tetrafluoroethylene to form octafluorocyclobutane and hexafluoropropene. The percentage composition of the gas mixtures is not critical. The tetrafluoroethylene can be separated from mixtures in which it constitutes the main component as well as those in which it is present in much smaller amounts.

The process in accordance with the invention has been schematically set forth in the attached drawing. As shown in the drawing, difluoromonochloromethane is introduced via line 1 into the pyrolysis oven 2, in which the pyrolysis is carried out at a temperature of between about 500° and 900° C. with a contact time of between about 0.05 to 0.5 seconds. The cooled pyrolysis gases are then introduced into the washer 3 in which, the hydrogen chloride which has been formed in the pyrolysis is scrubbed out with water and/or lye. The pyrolysis gas, free of hydrogen chloride is dried in drying apparatus 4 and introduced via line 5 into a countercurrent absorber 6. The inlet for the pyrolysis gas is located at the bottom, for instance, in the lower one-third of the absorber. At the top of the absorber, the methylisobutylketone is introduced, having a temperature within the range of from +60° to −30° C. Tetrafluoroethylene which has not been absorbed by the methylisobutylketone leaves the separator at the top through line 7 and is then sent to a storage tank. The unconverted difluoromonochloromethane as well as the by product fluorinated hydrocarbons which are soluble in methylisobutylketone are removed together at the foot of the separator. For separating out any tetrafluoroethylene absorbed into the methylisobutylketone, the methylisobutylketone can in the lower part 11 of the separator between the inlets for the pyrolysis gas and the outlet for the methylisobutylketone be warmed up, for example to a jacket temperature of the column of between 50° and 120° C. The driving out of dissolved Tetrafluoroethylene through warming can also be carried out in a separate column arranged following the counterflow absorber. The methylisobutylketone freed of tetrafluoroethylene is then introduced via line 8 into a heat exchanger 9 which is maintained at a temperature of 40° to 120° C. In this heat exchanger, a large part of the gas mixture still present in the methylisobutylketone is driven off. The methylisobutylketone flowing out of the heat exchanger is fed to a stripper column 10 in which it is heated to a temperature of 40° to 118° C., preferably 100° to 118° C. Thereby the fluorinated hydrocarbon compounds boiling at up to room temperature are driven out of the methylisobutylketone. The gas form products separated out in the heat exchanger and stripper column, in the main are difluoromonochloromethane and are introduced via line 12 back into the pyrolysis. The methylisobutylketone drawn off at the bottom of the stripping column is led over line 13, via cooler 14 and introduced again into the absorption column for use in the further separation of tetrafluoroethylene from pyrolysis gas mixture. After repeated recycling the methylisobutylketone can be subjected to a separation of halogenated hydrocarbons having boiling points higher than that of the solvent by distilling the methylisobutylketone under normal conditions.

The described process has the advantage that it can be automatically and continuously carried out. The process is also advantageous in that the unconverted difluoromonochloromethane can be recovered and recycled along with the total of the room temperature boiling by products. Additionally there is eliminated the expense of carrying out a pressure distillation of the tetrafluoroethylene containing gas mixture. The separating agent for the process of the invention, methylisobutylketone or its mixtures with halogenated hydrocarbons shows a larger differentiation between the solubility of tetrafluoroethylene and the other compounds of the pyrolysis. The higher boiling point of the methylisobutylketone or of its mixtures permits an easier separation of the absorbed components therefrom. In contrast to the known solvents, such as methanol or acetone, methylisobutylketone is a better solvent for difluoromonochloromethane and the other by products of the pyrolysis. Tetrafluoroethylene is therefore recovered in a greater degree of purity.

The methylisobutylketone, which is a conventional commercially available product is wide reachingly chemically stable so that after repeated recycling only small losses of solvent are encountered. Advantageously, methylisobutylketone is not a good solvent for water. Following the neutralizing and scrubbing out of the hydrogen chloride, any water entrained with the gas and thereafter transferred into the solvent can easily be separated off. There is thus no possibility of an undesirable decrease in solvent activity through dilution. The above superior properties are also associated with the solvent mixtures of the invention of methylisobutylketone and halogenated hydrocarbon.

The following Examples are given for the purpose of further illustrating the invention and not to be construed in any way as a limitation thereof.

EXAMPLE 1

A gaseous reaction mixture obtained in the pyrolysis of difluoromonochloromethane was washed in a scrubber with water and dried. The scrubbed gas mixture had the following composition:

| | |
|---|---|
| tetrafluoroethylene | 29.2 vol.% |
| difluoromonochloromethane | 64.2 " " |
| trifluoromethane | 0.7 " " |
| trifluoromonochloromethane | 0.3 " " |
| pentafluoroethane | 0.2 " " |
| hexafluoropropene | 0.5 " " |
| octafluorocyclobutane | 0.5 " " |
| higher boiling substances | 4.4 " " |

The gas mixture was introduced at a flow velocity of 2 to 2.5 liters/min. into the bottom part of a separator column having a diameter of 6 cm and a height of 200 cm. At the same time, methylisobutylketone was introduced, after first having been cooled in a cooler to −15° C., with a flow velocity of 0.1 liter/min., into the top of the column. The methylisobutylketone was maintained at this temperature throughout its stay in the column. Through the contact of the pyrolysis gas product with the organic solvent, all of the components other than tetrafluoroethylene were dissolved in the solvent.

The tetrafluoroethylene flowed out of the column at the top with a purity of 99 percent. The methylisobutylketone loaded with the gas form products flowed downwardly in the column to a lower section where it was heated to about 50° C. As a result of this short time elevation of the temperature of the methylisobutylketone, any absorbed tetrafluoroethylene was driven off. The methylisobutylketone taken off at the bottom of the column was passed into a heat exchanger and then to a stripper column.

The solution was taken off at the top of the column. Thereby the products which were gaseous at room temperature were separated out and could with further difluoromonochloromethane be charged into the pyrolysis.

In addition to the methylisobutylketone, mixtures can be used containing trichloroethylene, 1,1,2-trichloroethane, 1,1,2,2-tetrachlorodifluoroethane, 1,3-dichloropropene or preferably tetrachloroethylene.

Tetrafluoroethylene was recovered with an equal degree of purity if a mixture of methylisobutylketone and per chloroethylene in a volume ratio of 1:1 was substituted for the methylisobutylketone used in the Example.

EXAMPLE 2

A gaseous reaction mixture obtained in the pyrolysis of tetrafluoroethylene was washed in a scrubber with water and dried. The scrubbed gas mixture had the following composition:

| | |
|---|---|
| tetrafluoroethylene | 14.4 vol.% |
| hexafluoropropene | 75.5 " " |
| octafluorocyclobutane | 9.6 " " |
| higher boiling compounds | 0.5 " " |

The gas mixture was introduced at a flow velocity of about 2.0 liters/min. into the bottom part of a separator column having a diameter of 6 cm and a height of 200 cm. At the same time, methylisobutylketone was introduced, after first having been cooled in a cooler to −15° C., with a flow velocity of 0.1 liter/min. into the top of the column. The methylisobutylketone was maintained at this temperature throughout its stay in the column. Through the contact of the pyrolysis products with the organic solvent, all of the components other than tetrafluoroethylene were dissolved in the solvent. The tetrafluoroethylene flowing out of the top of the column had a purity of about 99.0 percent.

EXAMPLE 3

Crude gaseous tetrafluoroethylene having the following composition

| | |
|---|---|
| tetrafluoroethylene | 95.4 vol.% |
| trifluoromethane | 1.2 " " |
| difluoromethane | 0.2 " " |
| pentafluorochloroethane | 0.1 " " |
| hexafluoropropene | 1.9 " " |
| octafluorocyclobutane | 1.2 " " | was introduced at a flow velocity of about 2.5 liters/min. into the bottom part of a separator column as described in Example 2. The separator column was a packed column having a diameter of 6 cm and a height of 200 cm. At the same time, methylisobutylketone which had been cooled in a cooler to −18° C. was introduced into the top of the column, at a flow velocity of 0.1 liter/min. The temperature in the column was maintained at −18° C. The tetrafluoroethylene taken off at the head of the column had a purity of 99.2 percent.

While the invention has been illustrated and described as embodied in the process of separating tetrafluoroethylene from gas mixtures containing the same, it is not intended to be limited to the details shown, since various modifications and changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims:

1. Process for separating tetrafluoroethylene from gas mixtures other than those obtained in the pyrolysis of difluoromonochloromethane, the said gas mixture containing, in addition to tetrafluoroethylene, perfluorohydrocarbons and/or hydrogen containing fluorohydrocarbons with one to four carbon atoms, which process comprises passing the gas mixtures at a temperature of from +60° to −30° C. in countercurrent contact with methylisobutylketone in a separatory zone, collecting the tetrafluoroethylene at the top of said zone and the methylisobutylketone containing said perfluorohydrocarbons and/or hydrogen containing fluorohydrocarbons at the bottom of said zone.

2. Process according to claim 1, wherein said countercurrent contacting with methylisobutylketone is carried out at a temperature of less than 20° C.

3. Process according to claim 1, wherein said countercurrent contacting with methylisobutylketone is carried out at a temperature of from 0° to −20° C.

4. Process according to claim 1, wherein said methylisobutylketone is used in admixture with a halogenated aliphatic hydrocarbon which is a liquid under the treatment conditions and which has a boiling point not less than 80° C.

5. Process according to claim 4, wherein said halogenated hydrocarbon is perchloroethylene.

6. Process according to claim 1, wherein the collected methylisobutylketone is introduced into a subsequently arranged stripping zone for separating out therefrom any of the absorbed components which are gaseous at room temperature and the methylisobutylketone recovered from the stripping zone recycled for further contact with gas mixture.

* * * * *